United States Patent [19]

Walter

[11] 4,113,380
[45] Sep. 12, 1978

[54] FEEDING AND ELECTROSTATIC HOLDING ORIGINALS IN A COPYING MACHINE

[75] Inventor: Karl Walter, Penzberg, Fed. Rep. of Germany

[73] Assignee: Agfa-Gevaert AG, Leverkusen, Fed. Rep. of Germany

[21] Appl. No.: 828,971

[22] Filed: Aug. 29, 1977

[30] Foreign Application Priority Data

Aug. 27, 1976 [DE] Fed. Rep. of Germany ....... 2638695

[51] Int. Cl.² .................. G03B 27/62; B65H 9/08; B65H 11/02
[52] U.S. Cl. .................. 355/75; 361/234; 271/3; 271/DIG. 3; 271/236; 271/272
[58] Field of Search .......... 355/75, 76, 72, 91, 355/97, 99, 64, 65; 361/234; 271/3, DIG. 3, 236, 272

[56] References Cited

U.S. PATENT DOCUMENTS

| 3,448,356 | 6/1969 | Testone | 361/234 |
| 3,480,364 | 11/1969 | Barnett | 355/75 |
| 3,538,829 | 11/1970 | Munnich et al. | 355/76 X |

Primary Examiner—L. T. Hix
Assistant Examiner—W. J. Brady
Attorney, Agent, or Firm—Michael J. Striker

[57] ABSTRACT

An original to be copied is fed onto the copy table of the copying machine. The receipt of the original to be copied triggers the establishment of an electrostatic holding field which holds the original flat on the copy table during the exposure operation. Performance of the exposure operation triggers disestablishment of the electrostatic holding field. The polarity of the electrostatic holding field is successively reversed.

12 Claims, 9 Drawing Figures

FEEDING AND ELECTROSTATIC HOLDING ORIGINALS IN A COPYING MACHINE

BACKGROUND OF THE INVENTION

The invention relates to a system for feeding originals to be copied onto the copy table of a copying machine and electrostatically holding the originals flat on the copy table.

German allowed patent application DT-AS 21 48 666 discloses a system wherein originals to be copied are held in position electrostatically. In this holding system, an original to be copied is laid upon a horizontally positioned, electrostatically chargeable copy table. After the voltage which establishes the holding field is switched on, the copy table is swung to vertical position, to position the original for the exposure operation. The copy table comprises a dielectric layer beneath which is an interdigitated arrangement of two electrodes across which the potential difference which establishes the holding field is applied. When the original is laid onto the copy table, it must be positioned by hand or else the projection system is adjusted in correspondence to the position of the original. Proceeding in this way, it is, on the average, possible to produce single copies of single originals at a maximum rate of about 200 copies per hour. This low unit productivity is attributable to the time spent in laying and positioning the original on the copy table and in properly positioning the copy table relative to the projection system.

SUMMARY OF THE INVENTION

It is a general object of the invention to provide a system for the feeding and electrostatic holding of originals in a copying machine, such that the originals are automatically brought into the position on the copy table correct for the exposure operation to be performed, irrespective of whether the original, when fed into the copying machine, is flat or exhibits curvature.

It is another object to assure that the electrostatic holding field does not become established before the original has assumed the correct position relative to an optical reference line, and that the field thereafter becomes disestablished as soon as possible, so that upon completion of the exposure operation the removal of the original from the copy table can be performed without delay.

In the preferred embodiment of the invention, the copy table (referred to hereinafter as the original carrier) is swingable and/or shiftable into the exposure position thereof and comprises a base plate, an electrically conductive metal plate of large surface area atop the base plate, a thin plate of acrylic glass atop the metal plate, and atop the glass plate an electrically conductive metallic angled member extending along two edges of the original carrier. The acrylic glass plate insulates the angled member from the metal plate. A potential difference in the kilovolt range, preferably between 5 and 14 kV, is established between the angled member and the metal plate when an original is fed onto the original carrier and contacts the angled member. This potential difference is disestablished upon performance of the exposure operation.

Using this approach, the original can be very quickly and very accurately positioned on the original carrier and electrostatically held flat for only a brief time interval until just after the exposure operation has been performed.

In the preferred embodiment, separate infeed and outfeed units are provided, and the original carrier is tiltable about a horizontal turning axis to an inclined infeed position in which it receives downwardly infed originals, to a horizontal exposure position, and to an inclined outfeed position from which the supported original downwardly slides to the outfeed unit. This approach greatly shortens the time required for the pre-exposure infeed and the post-exposure outfeed, and the operator of the machine need not be called upon to properly position the original.

In order to assure that the original is held flat on the original carrier, it is contemplated to reverse the polarity of the applied potential difference upon each successive infeed of an original. This assures that, irrespective of any static charge on an original, it will be reliably held flat upon application of the potential difference; this applied especially for an original which is repeatedly fed into the copying machine.

To switch on the high voltage which establishes the holding field, it is preferred to make use of a polarity-reversing device which is activated in response to direct detection of the application of the original to the original carrier, i.e., when the original is deposited on the original carrier or as it is sliding along the surface of the carrier into position. Use is preferably made of a photodetector, such as a photodiode, positioned to receive infrared light along a light path which is blocked by a received original and which triggers the application of the potential difference in response to the original.

According to a preferred concept, the photodiode activates a current-surge-responsive relay, which furnishes a current surge for activating a high-voltage transformer at its primary-winding circuit and simultaneously triggers a polarity-reversing relay which reverses the polarity of the voltage applied across the metal plate and the metal angled member. In order to disestablish the holding voltage as quickly as possible, this is done in response to the trigger signal which triggers the flash-exposure operation itself. Accordingly, during the course of the flash-exposure operation itself, the electrostatic holding field which decays with a time delay will continue to hold the original flat, but will be disestablished as soon as possible upon completion of the exposure operation.

In order to assure that the original really will be in flat condition during the electrostatic holding thereof, it is necessary that the distance between the original and the support surface of the carrier be minimal. If the original exhibits marked curvature, then despite the electrostatic holding force, portions of the original may be spaced from the support surface a distance greater than permissible. It is contemplated to employ an infeed device comprised of a guide plate down which a flat original slides onto the original carrier, when the latter is in its inclined infeed position. However, a run of an endless belt extends along the guide plate, at a distance therefrom which decreases proceeding in the infeed direction. At the downstream end of this run, the next run of the belt extends away from the original carrier, and serves to detour originals exhibiting curvature to a deflecting roller around which such originals are transported and bent, and then from there dropped in flattened condition onto the original carrier.

According to an alternative concept, the infeed unit comprises an upstream pair of transport rollers and a downstream pair of transport rollers. A deflecting plate is located intermediate the pairs of rollers and routes flat originals from the first pair of rollers directly towards the original carrier, but diverts originals exhibiting curvature to the second pair of transport rollers, which subject the original to a bending force tending to eliminate the curvature and then deposit the original in now flattened condition onto the original carrier. Of the first pair of transport rollers, one is of hard non-yieldable material, preferably metal, and the other is of elastically resilient material. The same applies to the second pair of rollers. However, the rollers of the first pair are in relatively light pressing engagement, whereas those of the second pair are in strong pressing engagement, so much so as to cause the harder of the two to continually deform the peripheral portion of the softer of the two with which it is in contact at any given moment.

The carrier plate of the original carrier is preferably made of epoxide resin and provided with a copper coating which can serve as the aforementioned metal plate. To properly position the original carrier relative to the infeed means and relative to the projection system of the copying machine, it is contemplated to mount the original carrier on x- and y-carriages and on screw-spindle lifts for displacement in three mutually perpendicular directions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
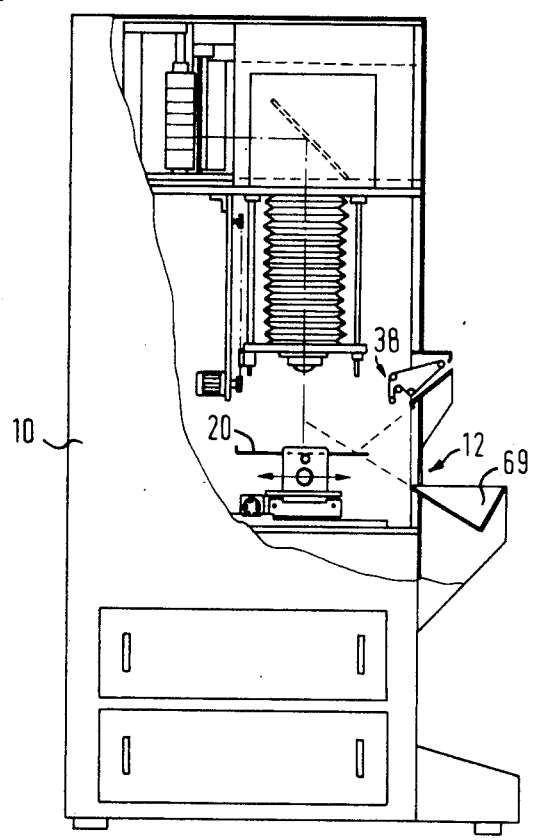
FIG. 1 is a partially cut-away overall view of a copying machine in which the inventive system is employed.

The copying machine 10 shown in FIG. 1 is operative for making image-to-image copies of colored positive originals. The upper part of the machine 10 includes a supply roll of copying-material web, a transport and guidance system for moving the web through the exposure station of the machine, and an adjustable masking system at the exposure station.

The control electronics for the copying machine 10 are provided in slide-out units at the bottom of the machine. The copy table 20 (herein referred to as the original carrier) upon which an original to be copied is supported is located beneath the projection system of the machine. Numeral 12 generally denotes the system for feeding originals to be copied and holding them electrostatically in place on the carrier 20, and includes the carrier 20 and an infeed device 38. An outfeed unit 69 receives originals which have been copied.

Figure 2:
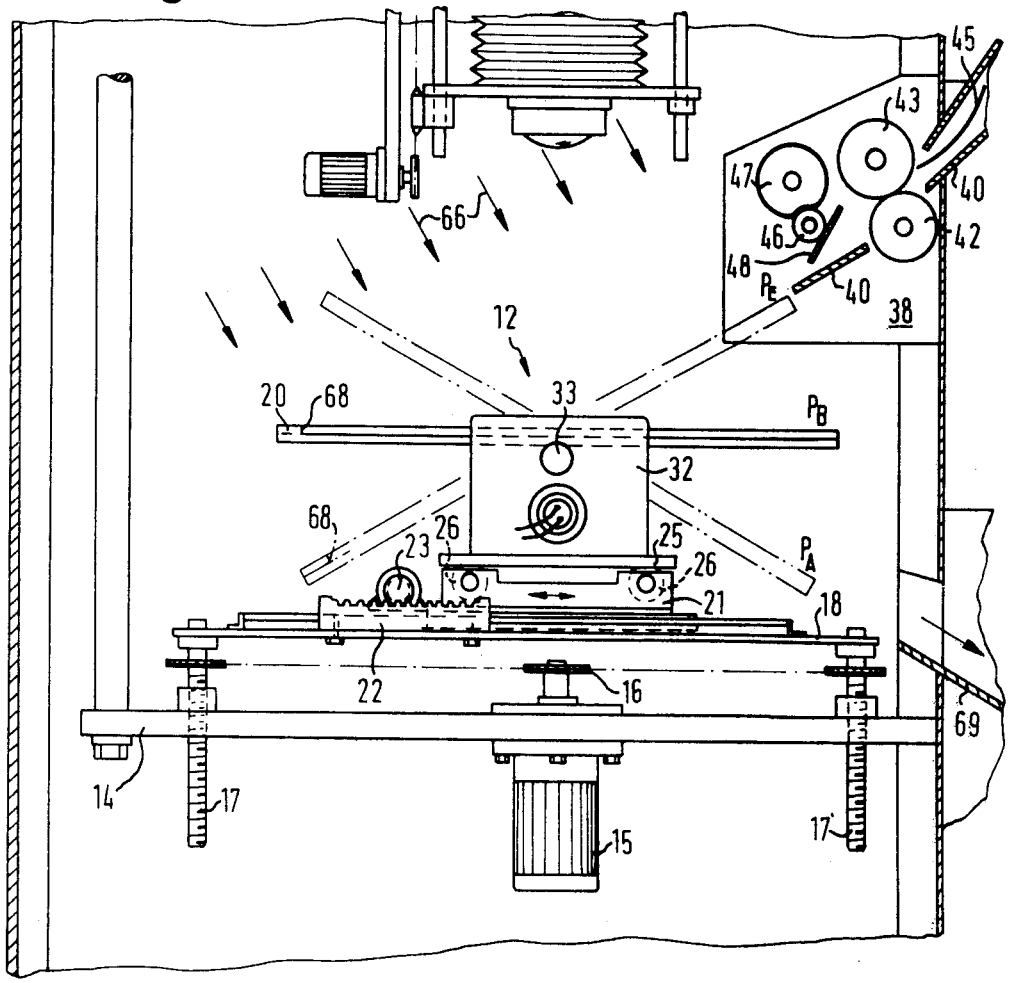
FIG. 2 is a side view of the carriages supporting the original carrier.
Figure 4:
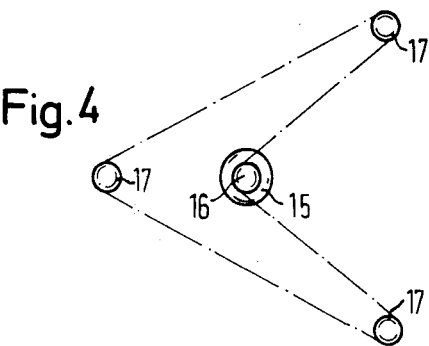
FIG. 4 depicts the arrangement of screw-spindle lifts for raising and lowering the carriages supporting the original carrier.
Figure 3:
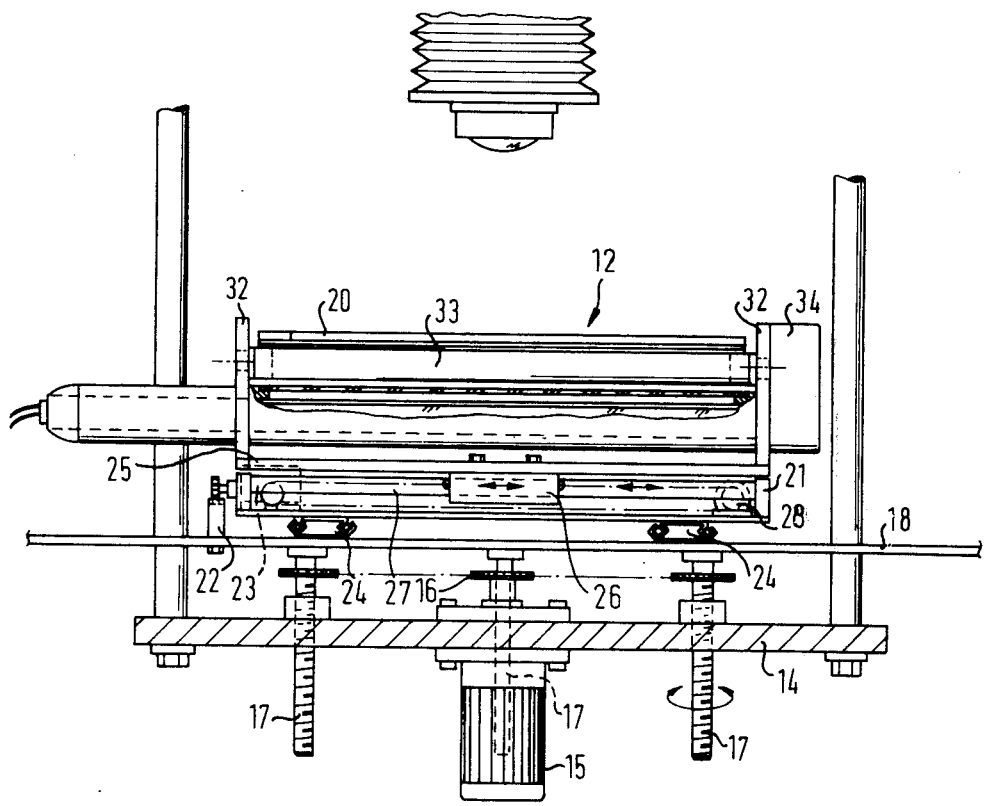
FIG. 3 is a front view of the structure shown in FIG. 2.

FIGS. 2–4 depict the relevant parts of the machine in greater detail. As can be seen, the original carrier 20 is mounted for swinging movement and also for x-, y- and z-movement.

A base plate 14 is mounted on the framework of the copying machine. The base plate 14 mounts a motor 15 operative for raising and lowering the original carrier 20. Motor 15 has an output sprocket wheel 16 which drives a sprocket chain entrained about the sprocket wheels of a set of three screw-spindle lifts 17. The arrangement of the output sprocket wheel 16, the screw-spindle lifts 17 and the sprocket chain is shown in FIG. 4.

Mounted on the upper ends of the screw-spindle lifts 17 is a carrier plate 18, on which are mounted the x- and y-direction carriages for shifting the original carrier 20 and the drive motors for the carriages. The lower carriage 21 is provided for forward-backward shifting, and is ball-bearing-mounted on guide rails 24 (see especially FIG. 3). The drive motor 23 for carriage 21 is mounted on carriage 21 itself and provided with an output pinion which meshes with a rack 22 mounted directly on the carrier plate 18. The upper carriage 25 effects leftward-rightward shifting of the original carrier 20. The bottom of carriage 25 is provided with guide sleeves 26 (see FIG. 5) which slide along guide rails 27. Carriage 25 is driven by a drive motor 28, through the intermediary of a drive chain 29 and a sprocket wheel 30.

Figure 5:
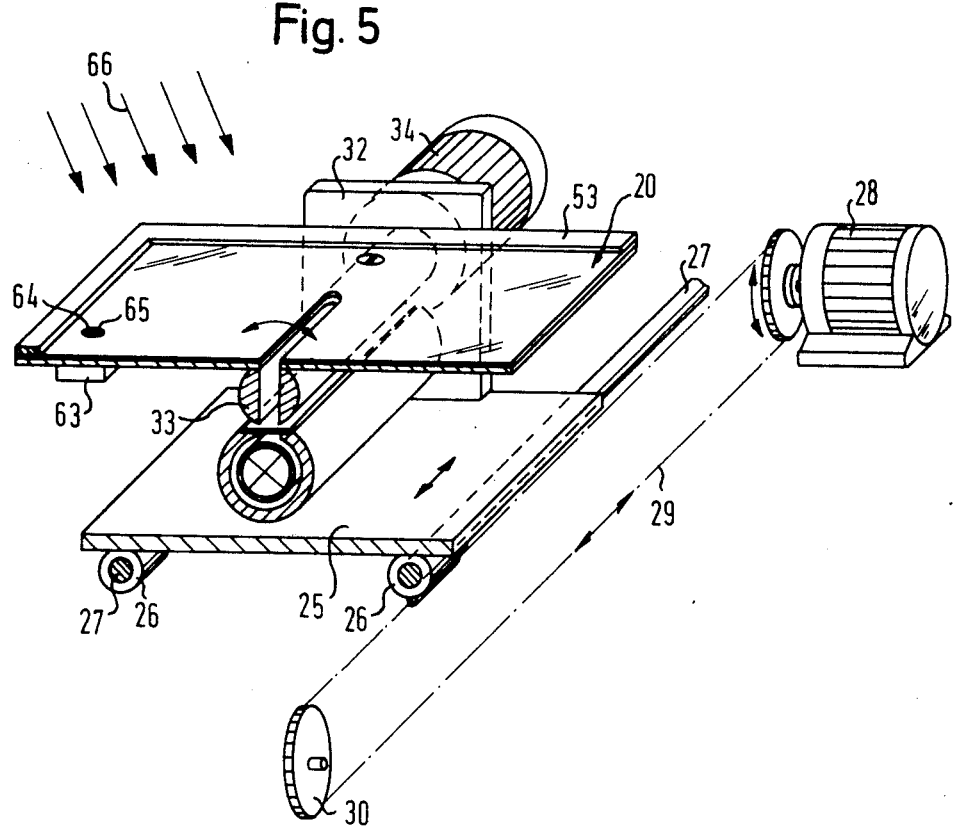
FIG. 5 is a perspective view of part of the original carrier and the upper one of the carriages upon which it is mounted.

The original carrier 20 is mounted on the upper carriage 25. The carriage 25 is provided with upright mounting walls 32. These turnably mount a shaft 33 turnable by a motor 34 mounted on one of the upright mounting walls 32. The top side of shaft 33 (as viewed in FIG. 5) is flattened, to provide good support for original carrier 20. The original carrier 20 is welded or, as shown in FIG. 5, screwed to the turnable shaft 33. The motor 34 is used to turn the original carrier 20 to three different angular positions: an infeed position $P_E$ for infeed of an original, an exposure position $P_B$, and an outfeed position $P_A$ for outfeed of an original (see FIG. 2).

When in the infeed position $P_E$, the original carrier 20 is oriented for cooperation with an infeed unit 38. An original 45 to be copy is deposited on the surface of carrier 20, and slides down the surface of carrier 20 until stopped by an edge-stop 68 defined by an angle member 53 whose purpose is explained below.

Figure 7:
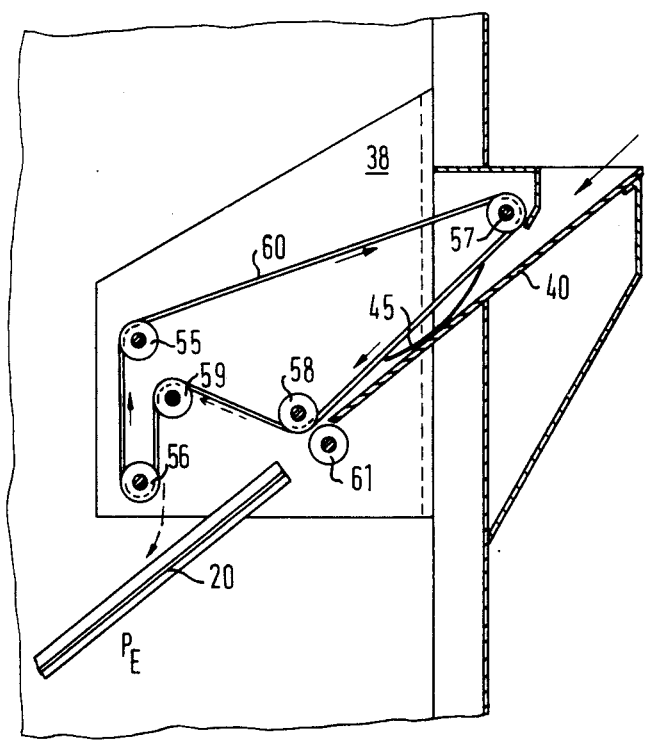
FIG. 7 depicts an exemplary infeed unit.

One embodiment of the infeed unit 38 is shown in FIG. 2 and another in FIG. 7. The infeed unit 38 of FIG. 2 includes two infeed rollers 42, 43, of which roller 42 is made of metal and roller 43 of a resilient elastic material. The distance between the rotation axes of rollers 42, 43 is so adjusted that the two rollers press against each other lightly. A guide plate 40 is provided downstream of rollers 42, 43, so that an infed original 45 can slide down this plate onto the surface of the original carrier 20, provided that the original is reasonably flat. However, the original 45 (as shown in FIG. 2) may not be flat, for example if made of coated material, and instead exhibit curvature. To eliminate this curvature, a further roller 46 made of metal is provided. Roller 46 presses against a roller 47 made of resilient elastic material, with a pressing force causing deformation of the roller 47. A deflecting plate 48 is located beneath roller 46. If a curved original 45 is transported between infeed rollers 42, 43 and, due to its curvature, its leading end does not engage the deflecting plate 48 and become deflected towards the guide plate 40, the leading end of the original 45 enters between the rollers 46, 47 and is subjected to deformation tending to establish a curvature opposite to its original curvature. As the original 45 leaves the rollers 46, 47 it will be in relatively flat condition, and in that condition is deposited onto the surface of original carrier 20.

Figure 6:
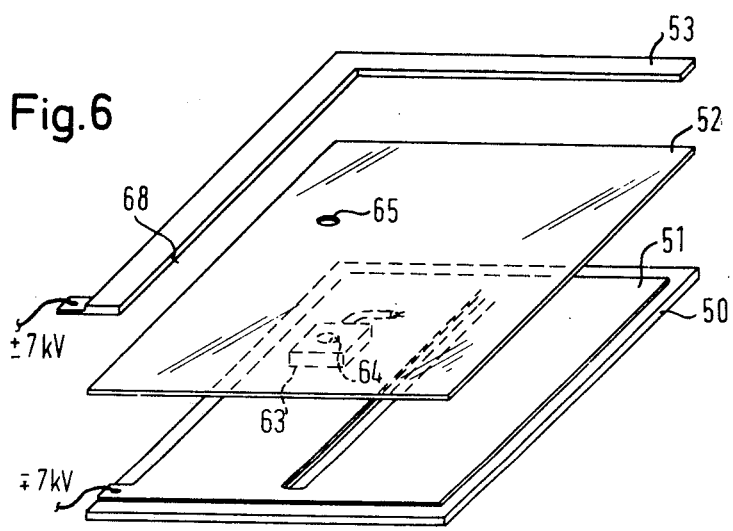
FIG. 6 is an exploded view showing the construction of the original carrier.

The original carrier 20 itself, as shown in FIG. 6, comprises a carrier plate 50, atop which is provided a metal plate 51. The metal plate 51 is covered by a plate 52 of acrylic glass. An angled member 53, which defines the aforementioned edge stop 68, runs along the length of the downstream end and one lateral side of the original carrier 20 and the metal plate 51. The angled member 53, which is made of metal, is electrically insulated from the metal plate 51 by the intermediate plate 52 of acrylic glass.

FIG. 7 depicts an alternative embodiment of the infeed unit 38. The infeed unit comprises five guide rollers 55-59 and a transport belt 60 trained about these rollers. The guide plate 40 extends along the run of the belt 60 between rollers 57 and 58, and the spacing between this run of belt 60 and the guide plate 40 decreases in the downstream direction. At the downstream end of this run of belt 60, the spacing between belt 60 and guide plate 40 corresponds approximately to the thickness of the stock of the original. Downstream of roller 58, belt 60 extends in a direction away from the original carrier 20 to and over the guide roller 59, then down and around the guide roller 56, then up and over the roller 55 for return to the roller 57.

If the original 45 is reasonably flat, it slides down along guide plate 40, passes between guide roller 58 and a cooperating roller 61, and is deposited onto the surface of the original carrier 20. If, as shown in FIG. 7, the original 45 exhibits curvature, it is conveyed by belt 60 towards and over roller 59, and subjected to bending in a sense reducing its curvature, after which it is deposited in relatively flat condition onto the surface of original carrier 20.

The original carrier 20 (see FIG. 5) is provided, somewhat upstream of the edge stop 68 for the downstream end of the infed original, with a senser 63 including a photodiode 64. The photosensitive surface of photodiode 64 is exposed, through an opening 65 in the original carrier 20, to the infrared light 66 emitted by a (non-illustrated) infrared-light source.

In operation, the original to be copied is deposited onto the original carrier 20, with the latter in its infeed position $P_E$, and its leading end slides down to the edge stop 68. In doing so, the original passes over the opening 65 and blocks the photodiode 64 from receipt of the infrared light 66. In response, photodiode 64 generates a control signal, and the latter triggers the establishment of a potential difference of for example 7kV between the metal plate 51 and the angled metal plate 53. By the time the leading end of the original actually reaches the edge stop 68, an electrostatic holding field will have been established between metal plate 51 and angled metal plate 53, and thereafter, i.e., for the subsequent exposure operation, the original is electrostatically held flat upon the acrylic glass plate 52.

Thereupon, the original carrier 20 is turned to its exposure position $P_B$, and the original is illuminated by a flash of exposure light. The 7 kV potential difference establishing the electrostatic holding field is switched off in synchronism with the flash of exposure light, and the electrostatic holding field decays rather quickly, so that when the original carrier 20 is thereafter turned to its outfeed position $P_A$ the original can slide off the original carrier 20 into the outfeed unit 69.

In order to assure that originals charged with static electricity do not cling to the original carrier 20 in a sense which would prevent them from sliding along the original carrier, the polarity of the potential difference established between metal plate 51 and angled metal plate 53 is reversed for each successive infeed of an original.

The high potential difference employed, e.g., 7 kV, is produced by a high-voltage step-up transformer whose primary winding is provided with a current-surge-responsive switchover relay. The switchover relay reverses the polarity of the applied potential difference, each time the potential difference is applied between the metal plates 51, 53. The triggering of the application of this high potential difference by the photodiode 64 assures that the electrostatic holding field will not build up to an operative value until the leading end of an infed original actually reaches the edges stop 68 and becomes lined up by the edge stop 68, i.e., properly positioned on the original carrier 20.

The distance from the photodiode 64 to the edge stop 68 is so selected that, when the high potential difference is applied, the time-delay elapsing before the electrostatic holding field builds up to an operative value is longer than the time required for the leading end of the sliding original to travel from the opening 65 to the edge stop 68.

To improve the outfeed action when, after the exposure operation, the original carrier 20 is tilted to its outfeed position $P_A$, it is advantageous to divide the two legs of angled metal plate 53, and to mount the leg defining the edge stop 68 for swinging movement or other displacement. The edge stop 68 can then be provided with an electromagnetically operated mover which is operative, when the original carrier is tilted to its outfeed position $P_A$, for striking the (now trailing) edge of the original on the original carrier, to accelerate the outfeed sliding of the original from the original carrier to the outfeed unit 69.

Figure 9:
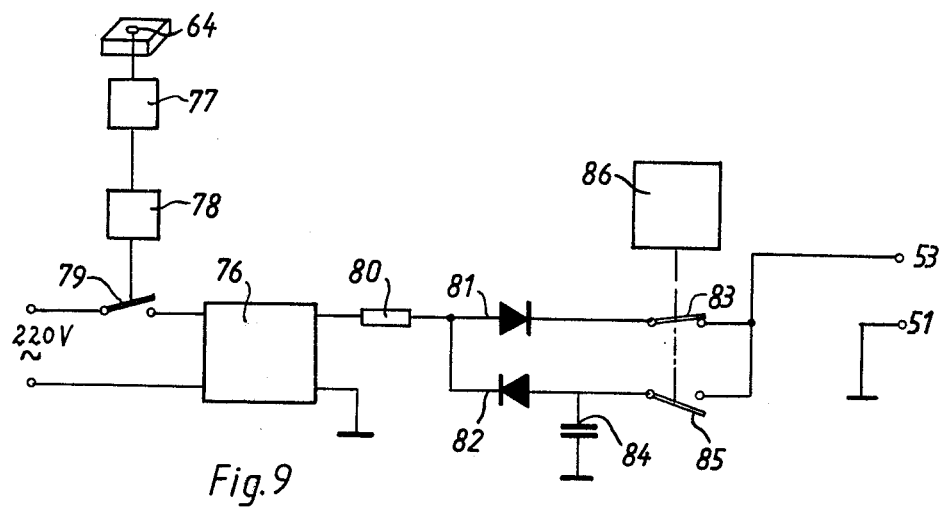
FIG. 9 depicts an alternative control circuit.
Figure 8:
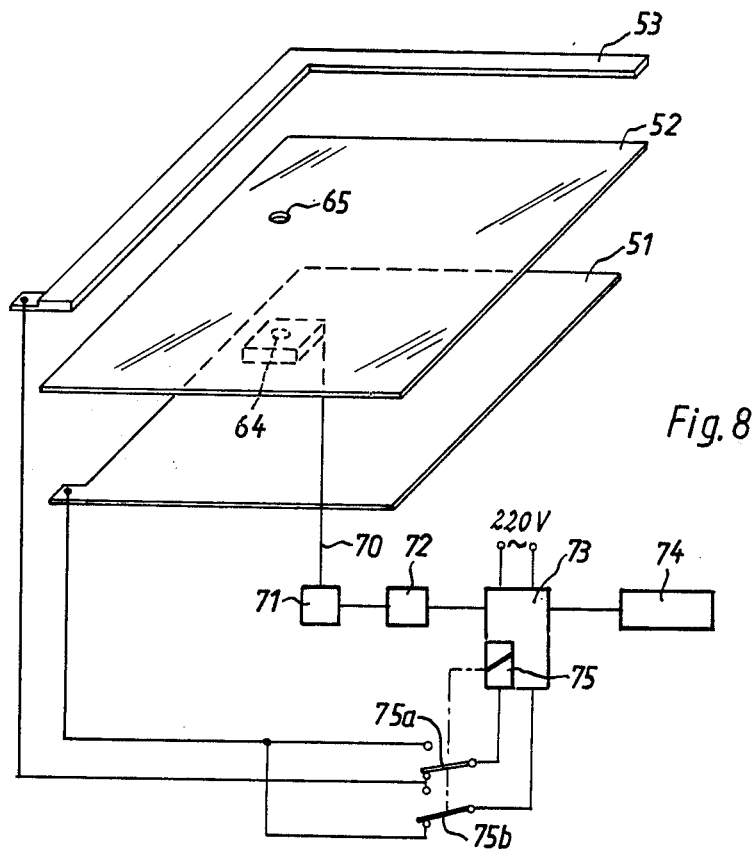
FIG. 8 depicts a first control circuit.

FIGS. 8 and 9 depict two circuit embodiments for controlling the application of the electrostatic holding force.

In FIG. 8, components 51, 52, 53, 64 and 65 correspond to the identically denoted components of FIG. 6. The output signal from photodiode 64 is transmitted via a a line 70 to a switching amplifier 71. The switching amplifier 71 switches the infrared-light source off and, after the elapse of a time delay established by a time-delay stage 72, switches on the high-voltage step-up transformer 73. Transformer 73 receives 220 V and produces across its secondary 7 kV D.C. Later on, i.e., when an exposure operation is performed, a synchronizer 74 responsive to performance of the exposure operation will switch transformer 73 off, to discontinue the electrostatic holding field and thereby permit the original to slide off the original carrier 20 when the latter is tilted to its outfeed position $P_A$. Synchronizer 74 can be synchronized with the transport system for the web of copying material on which the copies are formed, or it can be synchronized with the exposure-flash system itself.

Connected in the current path of step-up transformer 73 is a current-surge-responsive switchover relay 75.

Each time current begins to build up with a high slope in the current path of transformer 73, switchover relay 75 responds and changes state. In response to the next such current surge, switchover relay 75 undergoes an opposite change of state, and so on. Current-surge-responsive relay 75 controls a set of switchover contacts 75a, 75b. Contacts 75a, 75b cooperate with three stationary contacts, of which the middle stationary contact is electrically connected to angled metal plate 53 and the outer stationary contacts to metal plate 51. In the illustrated setting of the set of switchover contacts 75a, 75b, the 7 kV output voltage of transformer 73 is applied across plates 51, 53 with one polarity; in the other setting of switchover contacts 75a, 75b, the output voltage of transformer 73 is applied across plates 51, 53 with the opposite polarity.

The operation of the circuit shown in FIG. 8 is as follows:

In its quiescent state, i.e., with no original interrupting the incidence of infrared light 66 upon photodiode 64, the current path of step-up transformer 73 is open. Both the rectangular metal plate 51 and the angled metal plate 53 are at substantially ground potential. If an original slides down the original carrier 20 when the latter is in its infeed position $P_E$, the original blocks photodiode 64 before reaching edge stop 68, and a signal is applied to switching amplifier 71. The time-delay stage 72 delays the switch-on of transformer 73 for an interval sufficient to permit the edge of the infed original to reach the edge stop 68. Thereupon, the current path of transformer 73 is closed, and the steep-slope current buildup in the current path of transformer 73 causes current-surge-responsive relay 75 to undergo a change of state. The switchover contacts 75a, 75b change from whichever settings they are in to their other settings, and the 7 kV output voltage of transformer 73 is applied across metal plates 51, 53 with one or the other polarity. The original is thereupon electrostatically held flat against the acrylic glass plate 52. This holding action is continued so long as an exposure operation is actually in progress. Upon performance of the exposure operation, the synchronizer 74 opens the primary-winding current path of transformer 73. Accordingly, the 7 kV voltage is removed from across plates 51, 53. Due to insulation losses of components 51, 53, these components discharge, and the electrostatic holding action decays rather quickly. Upon termination of the electrostatic holding action, the original carrier 20 tilts to its outfeed position $P_A$, causing the supported original to be thrown off with sliding action from the original carrier to the outfeed unit 69. When, now, another original is deposited on original carrier 20, the operations performed above are repeated, but this time the polarity of the 7 kV voltage applied across metal plates 51, 53 is reversed. Accordingly, this next original is likewise held flat by electrostatic holding action, but with a reversed-polarity holding field.

This repeated reversal of polarity has been found to be particularly important in applications where an original is repeatedly fed into the copying machine. Each time a repeatedly infed and copied original is subjected to the electrostatic holding action, it tends to have, after outfeed, a residual electrostatic charge. If the polarity of the electrostatic holding field were not reversed for each infeed operation, then the residual electrostatic charge on such an original would tend to progressively increase, eventually producing difficulties during outfeed. By repeatedly reversing the polarity of the holding feed, the residual electrostatic charge on a repeatedly infed original cannot build up to a troublesome level.

In the embodiment depicted in FIG. 9, a somewhat different expedient is employed. In this embodiment, the transformer 76 is a simple step-up transformer, not provided with a current-surge-responsive relay. Transformer 76 converts a 220 V A.C. voltage to a 7 kV A.C. voltage. The photodiode 64 applies a control signal to a switching amplifier 77 which, through the intermediary of a time-delay stage 78, controls the setting of a switch 79 connected in the primary-winding current path of transformer 76. One output of transformer 76 is maintained at ground potential; the other output is connected via a current-limiting resistor 80 to two antiparallel diodes 81, 82. The latter are connectable by swtiches 83, 85 to the angled metal plate 53. The rectangular metal plate 51 is maintained at ground potential. The output of diode 82 is connected to ground via a capacitor 84. The capacitance of capacitor 84 is approximately equal to that of the capacitor constituted by the metal plates 51, 53 and the intermediate dielectric plate 52. Switches 83 and 85 are normally closed and normally open, respectively. Switches 83 and 85 are controlled by a synchronizer unit 86 synchronized with operation of the copying machine. Synchronizer unit 86 is activated at the end of each exposure operation. At the end of each exposure operation, the angled metal plate 53 is briefly disconnected from diode 81 and briefly connected to capacitor 84.

When the circuit of FIG. 9 is in its quiescent state, the primary-winding current path of transformer 76 is open, and both metal plates 51, 53 are at ground potential. When an original is fed onto the carrier 20, photodiode 64, via switching amplifier 77 and time-delay stage 78, closes switch 79, and 7 kV A.C. output voltage appears across the secondary of transformer 76. The positive voltage half-cycles are applied via diode 81 to the angled metal plate 53, whereas the negative voltage half-cycles charge capacitor 84. At the end of an exposure operation, synchronizer unit 86 briefly opens switch 83 and briefly closes switch 85. During this short time interval, angled metal plate 53 is at ground potential or at a somewhat negative potential, so that the electrostatically charged original, due to this change of applied potential difference, is repelled and can easily slide off the original carrier 20 into the outfeed unit 69, when carrier 20 is tilted to its outfeed position $P_A$. When the original leaves carrier 20, photodiode 64 becomes unblocked again, and switch 79 reopens.

The embodiment of FIG. 9 can be simplified by omitting the capacitor 84, and by connecting the output of diode 82 to metal plate 51, with the output of diode 81 connected to angled metal plate 53 as before. In that event, both switches 83, 85 would be normally closed switches, and would be operative at the end of the exposure operation for briefly disconnecting plates 51, 53 from the diodes and instead connecting these plates to ground potential.

When the original is illuminated by means of a flash of exposure light, the synchronizer units 74, 86 of FIGS. 8 and 9 can be activated by the trigger signal for the exposure-light flash unit. If an ordinary lamp is used to illuminate the original, the synchronizer units can be activated by the shut-off signal which shuts off the exposure-light lamp at the end of the exposure operation. Synchronizer units 74, 86 could also be utilized to trigger the tilting of original carrier 20 from its exposure position $P_B$ to its outfeed position $P_A$. The circuit which tilts the original carrier 20 from its outfeed position $P_A$ back to its infeed position $P_E$ can be a simple time-delay mechanism activated by the signal generated at the end of the exposure operation, because the outfeed of the original requires a relatively short and relatively constant amount of time. The original carrier 20 can be tilted from its outfeed position $P_A$ to its infeed position $P_E$ as soon as possible after the outfeed operation has been completed. The tilting of original carrier 20 from its infeed position $P_E$ to its exposure position $P_B$ can be triggered using the signals produced at the outputs of time-delay stages 72, 78 in FIGS. 8 and 9, inasmuch as the time required to mechanically turn the original carrier to its exposure position will anyway be considerably greater than that required to establish the electrostatic holding field.

It will be understood that each of the elements described above, or two or more together, may also find a useful application in other types of constructions and circuits differing from the types described above.

While the invention has been illustrated and described as embodied in a system for infeed and electrostatic holding of originals to be copied in a particular type of copying machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a copying machine provided with means for performing an exposure operation by illuminating an original to be copied and projecting the image of the illuminated original onto copying material, in combination, an original carrier mounted to receive on its surface an infed original and support the original, the original carrier comprising a carrier plate, an electrically conductive metal plate atop the carrier plate, a layer of acrylic glass atop the metal plate, and atop the glass plate an angled member of electrically conductive metal having two legs extending along two edges of the original carrier for positioning the edges of originals to be copied; and holding means operative for holding an original flat on the carrier plate during the exposure operation by means of electrostatic holding force, including means operable when an original contacts the angled member for establishing between the metal plate and the metal angled member a potential difference in the kilovolt range and disestablishing the potential difference for removal of the original from the original carrier upon performance of the exposure operation.

2. In a copying machine as defined in claim 1, further including means mounting the original carrier for turning movement about a horizontal turning axis between an inclined infeed position, a horizontal exposure position and an inclined outfeed position, infeed means operative when the original carrier is in the inclined infeed position for feeding an original to be copied downward along the surface of the inclined original carrier, and outfeed means operative when the original carrier is in the inclined outfeed position for receiving from the original carrier an original moving downward along the surface of the inclined original carrier.

3. In a copying machine as defined in claim 1, the holding means including means operative for reversing the polarity of the potential difference for each successive original received on the original carrier and operative for disestablishing the potential difference upon performance of each exposure operation.

4. In a copying machine as defined in claim 3, the means for reversing the polarity of the potential difference including polarity-reversing means and means operative for activating the polarity-reversing means in response to direct detection of the receipt of an original upon the original carrier.

5. In a copying machine as defined in claim 4, the means for activating the polarity-reversing means comprising a source of infrared light and a photosensor located on opposite sides of the original carrier and defining a light path interrupted by an original received on the original carrier.

6. In a copying machine as defined in claim 5, the means establishing and disestablishing the potential difference including a transformer, means for initiating establishment of the potential difference by closing the primary-winding current path of the transformer, a current-surge-responsive relay connected in the current path of the transformer including switching contacts connecting the outputs of the transformer to the metal plate and the metal angled member.

7. In a copying machine as defined in claim 1, the means establishing and disestablishing the potential difference including synchronizing means responsive to a trigger signal commanding flash-exposure illumination of the original and operative in response thereto for disestablishing the potential difference.

8. In a copying machine as defined in claim 2, the infeed means including a guide plate downwardly inclined for sliding transport of originals onto the original carrier when the latter is in the inclined position, and a belt transport system including an endless transport belt having a first run extending along the guide plate at a distance from the guide plate which decreases proceeding in the direction of infeed, and having a second run downstream of the first run extending in direction away from the original carrier for transport of originals exhibiting curvature away from the original carrier, and means downstream of the second run for bending originals exhibiting curvature in a sense reducing their curvature and thereafter depositing them onto the original carrier.

9. In a copying machine as defined in claim 2, the infeed means including a first pair of infeed rollers and downstream thereof a second pair of infeed rollers, a deflecting plate located downstream of the first pair of infeed rollers operative for routing flat originals directly to the original carrier and originals exhibiting curvature to the second pair of infeed rollers, the second pair of infeed rollers comprising one roller of non-resilient material and another roller of resilient material pressed against and deformed by the one roller, the two rollers of the second pair being arranged to bend originals exhibiting curvature in a sense opposite to such curvature and then deposit the flattened originals onto the original carrier.

10. In a copying machine as defined in claim 1, the carrier plate being made of epoxide resin and provided with a coating of copper forming the electrically conductive metal plate.

11. In a copying machine as defined in claim 1, including means mounting the original carrier for displacement in two mutually perpendicular horizontal directions and in the direction normal thereto.

12. In a copying machine as defined in claim 1, the angled member comprising a displaceably mounted portion mounted for ejecting an original from the original carrier.

* * * * *